Sept. 10, 1946.   C. HOLLERITH   2,407,423
WHEEL STRUCTURE
Filed April 2, 1945
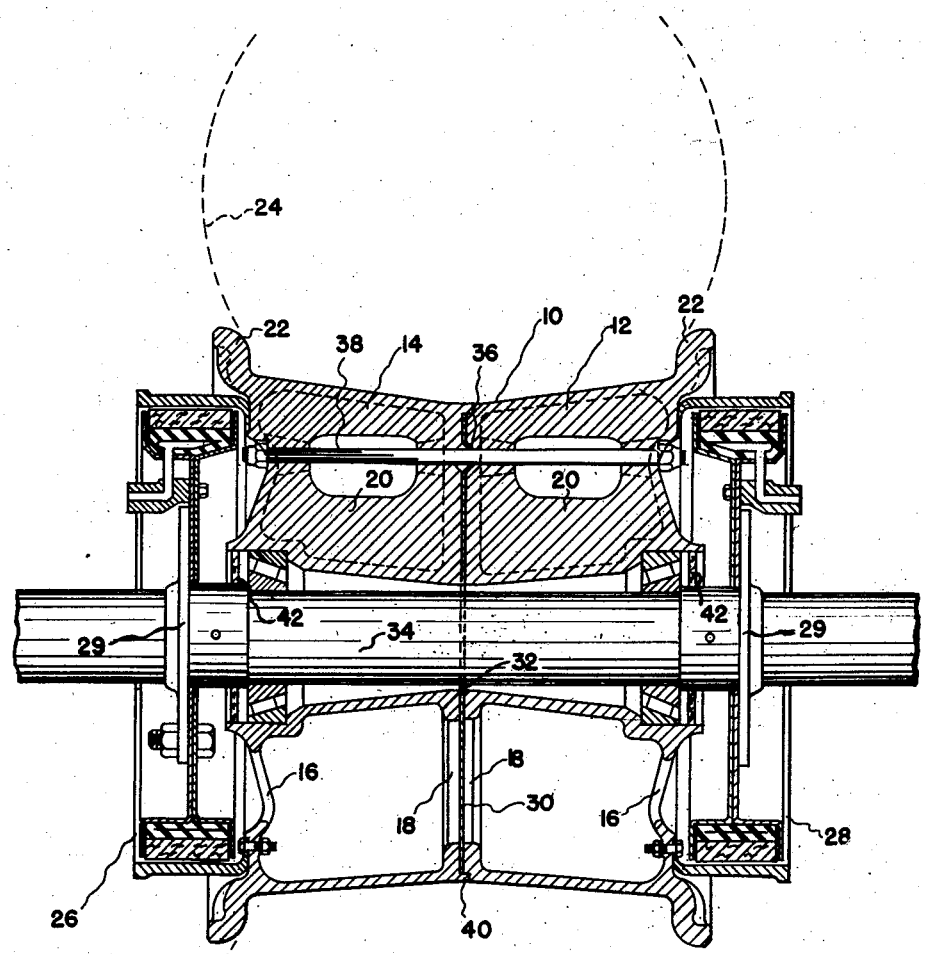
Inventor
CHAS. HOLLERITH
By Beaman & Langford
Attorney Patented Sept. 10, 1946

2,407,423

UNITED STATES PATENT OFFICE 2,407,423

WHEEL STRUCTURE

Charles Hollerith, Jackson, Mich., assignor, by mesne assignments, to The B. F. Goodrich Company, Akron, Ohio, a corporation of New York Application April 2, 1945, Serial No. 586,221

2 Claims. (Cl. 188—152)

The present invention relates to improvements in wheel structure, having particular reference to aircraft wheels of the type having brakes on both sides of the wheel.

One of the objects of the present invention is to provide an improved wheel structure in which provisions are made for preventing the possibility of leakage of the hydraulic brake system associated with one of the brakes from affecting the efficiency of the other brake.

Another object of the invention is to provide an improved wheel structure having an interior sealing means to prevent leakage of the hydraulic brake system of one brake from going through the interior of the wheel and rendering the opposite brake inefficient.

A still further object of the invention is to provide a split aircraft wheel of open work construction having a seal located centrally of the wheel and between the wheel part for sealing the interior of the wheel.

These and other objects and advantages residing in the combination, construction and arrangement of the functional parts will become more apparent from a consideration of the following specification and claims.

In the drawing, a vertical cross-sectional view of an aircraft wheel having dual brakes is shown.

The principles of the invention are illustrated in connection with an aircraft wheel 10 made up from cast sections 12 and 14, having circumferentially spaced openings 16 and 18 to lighten the construction as defined between the radial stiffening webs 20. Tire retaining flanges 22 support the pneumatic tire 24, shown in dotted line representation. Hydraulic brakes 26 and 28 are shown on opposite sides of the wheel 10 supported from the torque flange structure 29.

Located between the wheel sections 12 and 14 is a shield 30, preferably of light sheet metal, annular in construction and having an opening at 32 to provide clearance for the axle 34. Circumferentially spaced holes 36 are also provided to give clearance for the eye bolts 38 which draw the entire assembly together. The shield 30 is shown piloted on a flange 40 which also functions as a pilot for the abutting wheel sections 12. It will be understood that except for the provisions of the shield 30, should a rupture in the hydraulic system take place associated with the brake 26 for example, there would be a likelihood of hydraulic fluid splashing through the open work construction of the sections 12 and 14 fouling the braking action of the brake 28 on the opposite side of the wheel. By employing the shield 30 this will not take place as the openings 18 in the wheel sections 12 and 14 are effectively sealed by the drawing up action of the bolts 38, which clamp the shield 30 tightly between the sections 12 and 14.

Having thus described my invention, what I desire to cover by Letters Patent and claim is:

1. A wheel and brake assembly comprising an open work wheel structure having interior passages between the rim and hub, fluid operated brakes mounted on opposite sides of the wheel structure, and a shield extending between the rim and hub and walling off the interior of the wheel structure sealing the brake structures from each other through the interior of the wheel.

2. In combination, a sectional wheel of open work interior construction having interior passages extending between the rim and hub, a hydraulically actuated brake mounted upon opposite sides of said wheel, and a fluid shield mounted between said wheel sections and extending between said rim and hub, and sealing off the open work construction through the interior of the wheel.

CHARLES HOLLERITH.